(12) United States Patent
Yu et al.

(10) Patent No.: US 10,252,763 B2
(45) Date of Patent: Apr. 9, 2019

(54) SEATPOST WITH CONNECTING MOUNT AND CONNECTING MOUNT FOR THE SAME

(71) Applicant: LEE CHI ENTERPRISES CO., LTD., Changhua, Changhua County (TW)

(72) Inventors: An-Fu Yu, Changhua (TW); Yu-Tzu Chang, Changhua (TW)

(73) Assignee: LEE CHI ENTERPRISES CO., LTD., Changhua, Changhua County (TW)

( * ) Notice: Subject to any disclaimer, the term of this patent is extended or adjusted under 35 U.S.C. 154(b) by 105 days.

(21) Appl. No.: 15/498,205

(22) Filed: Apr. 26, 2017

(65) Prior Publication Data

US 2017/0334498 A1 Nov. 23, 2017

(30) Foreign Application Priority Data

May 17, 2016 (TW) .............................. 105207187 U

(51) Int. Cl.
*B62J 6/04* (2006.01)
*B62J 1/08* (2006.01)
*B62J 1/28* (2006.01)
*B62J 11/00* (2006.01)

(52) U.S. Cl.
CPC . *B62J 6/04* (2013.01); *B62J 1/08* (2013.01); *B62J 1/28* (2013.01); *B62J 11/00* (2013.01)

(58) Field of Classification Search
CPC ......... B62J 6/04; B62J 1/08; B62J 1/28; B62J 11/00; B62J 2001/085

USPC .......................................... 297/195.1, 195.13
See application file for complete search history.

(56) References Cited

U.S. PATENT DOCUMENTS

| 5,649,738 | A | * | 7/1997 | Thomson | B62J 1/08 |
| | | | | | 297/195.1 |
| 5,739,750 | A | * | 4/1998 | Drake | B62J 6/04 |
| | | | | | 188/24.22 |
| 7,293,900 | B1 | * | 11/2007 | Lee | B62J 6/04 |
| | | | | | 362/423 |

(Continued)

FOREIGN PATENT DOCUMENTS

| CN | 203681730 U | 7/2014 |
| CN | 104097717 A | 10/2014 |

(Continued)

*Primary Examiner* — Mark R Wendell
(74) *Attorney, Agent, or Firm* — Ming Chow; Sinorica, LLC

(57) ABSTRACT

A seatpost has a post body, an adjusting mount, a connecting unit, and a connecting bracket. The post body has a supporting base disposed at an upper end of the post body. The supporting base has a bore formed through a rear end of the supporting base. The adjusting mount is connected to the supporting base and has a passing hole disposed at a rear end of the adjusting mount. The connecting unit is connected to the adjusting mount and has a connecting portion having a threaded hole. A bolt passes through the bore, the passing hole, and is screwed with the threaded hole. The connecting bracket has a front end connected to the connecting portion, a rear end opposite the front end, and an assembling board disposed at the rear end of the connecting bracket for assembling a taillight or a bicycle license plate.

14 Claims, 6 Drawing Sheets

(56) References Cited

U.S. PATENT DOCUMENTS

| | | | | |
|---|---|---|---|---|
| 7,347,596 B2* | 3/2008 | Ishikawa | ................... | B62J 6/00 |
| | | | | 362/396 |
| 2007/0145794 A1* | 6/2007 | Dal Pra' | ................... | B62J 1/08 |
| | | | | 297/195.1 |
| 2007/0147057 A1* | 6/2007 | Mohr | ........................ | B62J 1/08 |
| | | | | 362/473 |
| 2008/0143153 A1* | 6/2008 | Lin | ........................... | B62J 1/08 |
| | | | | 297/195.1 |
| 2014/0230498 A1* | 8/2014 | Elson | ...................... | B62H 5/00 |
| | | | | 70/15 |
| 2016/0023702 A1* | 1/2016 | Lin | ........................... | B62J 1/08 |
| | | | | 297/215.15 |
| 2017/0129564 A1* | 5/2017 | Provost | ................. | B62K 19/40 |

FOREIGN PATENT DOCUMENTS

| | | |
|---|---|---|
| TW | 274265 | 4/1996 |
| TW | M293886 | 12/2005 |
| TW | M310165 | 4/2007 |
| TW | M431114 U1 | 6/2012 |
| TW | M482540 U | 7/2014 |
| TW | I458657 B | 11/2014 |

\* cited by examiner

SEATPOST WITH CONNECTING MOUNT AND CONNECTING MOUNT FOR THE SAME

BACKGROUND OF THE INVENTION

1. Field of the Invention

The present invention relates to a component of a bicycle, and more particularly to a seatpost with a connecting mount and the connecting mount for assembling accessories such as a taillight, a bicycle license plate, etc.

2. Description of Related Art

Conventional means for assembling a taillight on a bicycle is utilizing a connecting element made of plastic or metal to deposit the taillight on positions such as a seatpost, a saddle, a rear fender, a luggage carrier, etc. of the bicycle. Some patent documents have disclosed means for assembling the taillight on the bicycle by a rotating arm or a fastening mount that is directly and integrally formed on the seatpost. These means for assembling the taillight on the bicycle are difficult to be applied to assemble other accessories such as bicycle license plates and have drawbacks in use as well.

For example, Taiwan Patent Publication Number 274265 and China Patent Publication Number 203681730 U have disclosed a taillight connected to a ferrule which is mounted around a seatpost. The taillight connected by this manner resulting in an assembling height of the taillight is low, hindering visibility and warning effect of the taillight. Also, the seatpost has to reach out long enough from a seat tube for mounting around the ferrule and causes a limitation in adjusting height of the seatpost.

Taiwan Patent Numbers: M431114 and M482540 have disclosed a taillight connected to two saddle rails of a saddle by a fastening frame. The taillight connected by this manner has problems of complicated structure, inconvenient assembling, and high cost.

Taiwan Patent Numbers: 1458657 and M310165 have disclosed a taillight assembled on a rear fender or a luggage carrier of a bicycle. An assembling height of the taillight assembled by this manner is low and decreases visibility and warning effect of the taillight. Weight of the taillight is added to weight of the rear fender or the luggage carrier to cause vibrations and fatigue wear during marching.

Taiwan Patent Number M293886 has disclosed a taillight assembled to a spinning arm integrally formed on a seatpost of a bicycle. Furthermore, China Patent Publication Number 104097717 A has disclosed a taillight assembled to a fastening mount integrally formed on a seatpost of a bicycle. Such a taillight assembling manner requires custom-made seatposts and is unable to be applied to the seatposts with regular specifications. Spinning arms or fastening mounts integrally formed on the seatpost have problems of high price and inconvenience for maintenance and repairing.

To overcome the shortcomings of the conventional means of taillight assembling, the present invention provides a seatpost with a connecting mount to mitigate or obviate the aforementioned problems.

SUMMARY OF THE INVENTION

The main objective of the present invention is to provide a seatpost with a connecting mount for assembling accessories such as a taillight, a warning light, a bicycle license plate, etc and to make the accessories highly visible.

The seatpost comprises a post body, an adjusting mount, a connecting unit, and a connecting bracket. The post body has a supporting base disposed at an upper end of the post body. The supporting base has a bore formed through a rear end of the supporting base. The adjusting mount is connected to the supporting base and has a passing hole disposed at a rear end of the adjusting mount. The connecting unit is connected to the adjusting mount and has a connecting portion having a threaded hole. A bolt passes through the bore, the passing hole, and is screwed with the threaded hole. The connecting bracket has a front end connected to the connecting portion, a rear end opposite the front end, and an assembling board disposed at the rear end of the connecting bracket for assembling a taillight or a bicycle license plate.

The seatpost in accordance with the present invention not only provides an optimum assembling height for promoting visibility and warning effect of the taillight, but also has advantages of simple structure, easy assembling, secure fastening, and low cost.

Other objects, advantages, and novel features of the invention will become more apparent from the following detailed description when taken in conjunction with the accompanying drawings.

DETAILED DESCRIPTION OF PREFERRED EMBODIMENT

Figure 1:
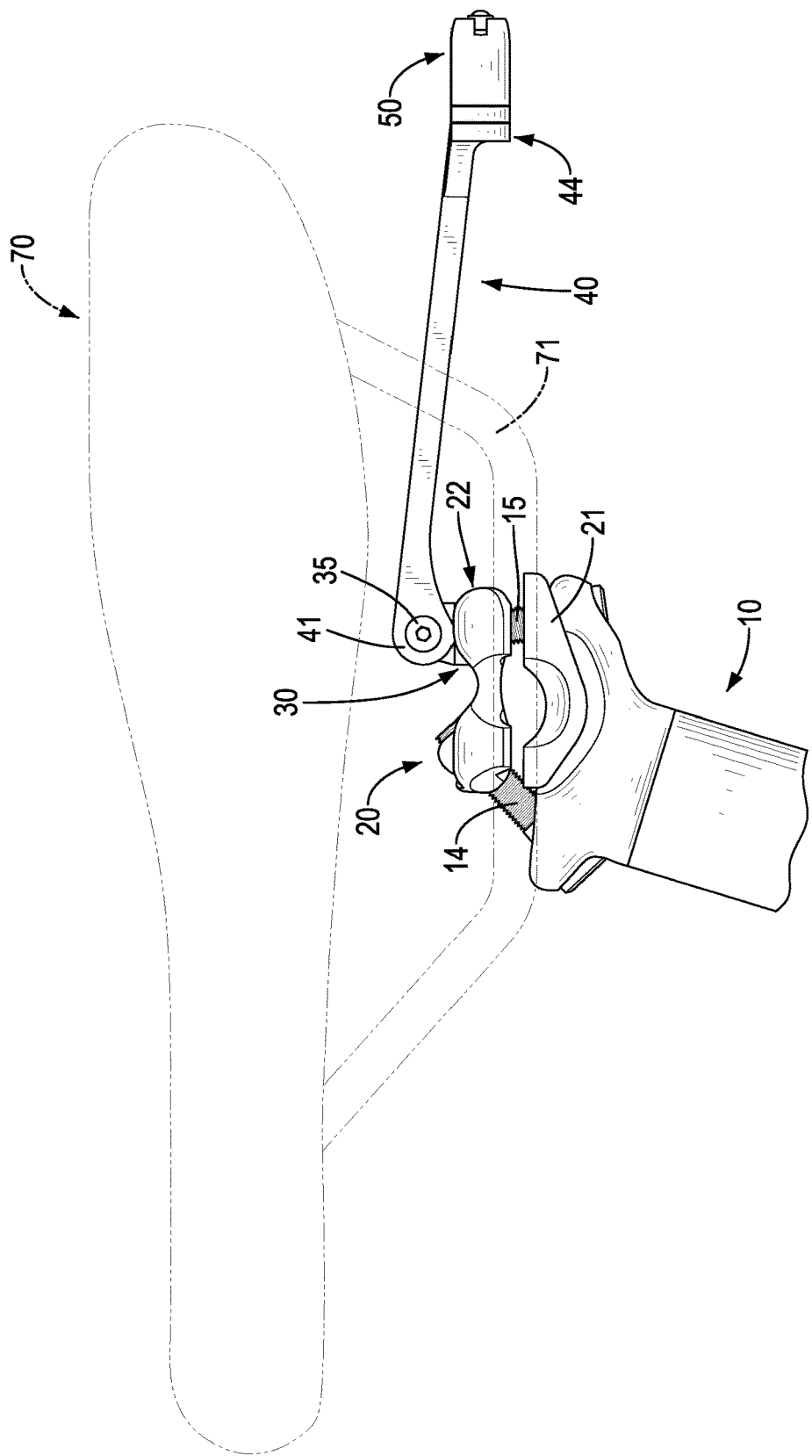
FIG. 1 is a side view of a seatpost in accordance with the present invention, connected to a taillight below a saddle.
Figures 2A, 2B:
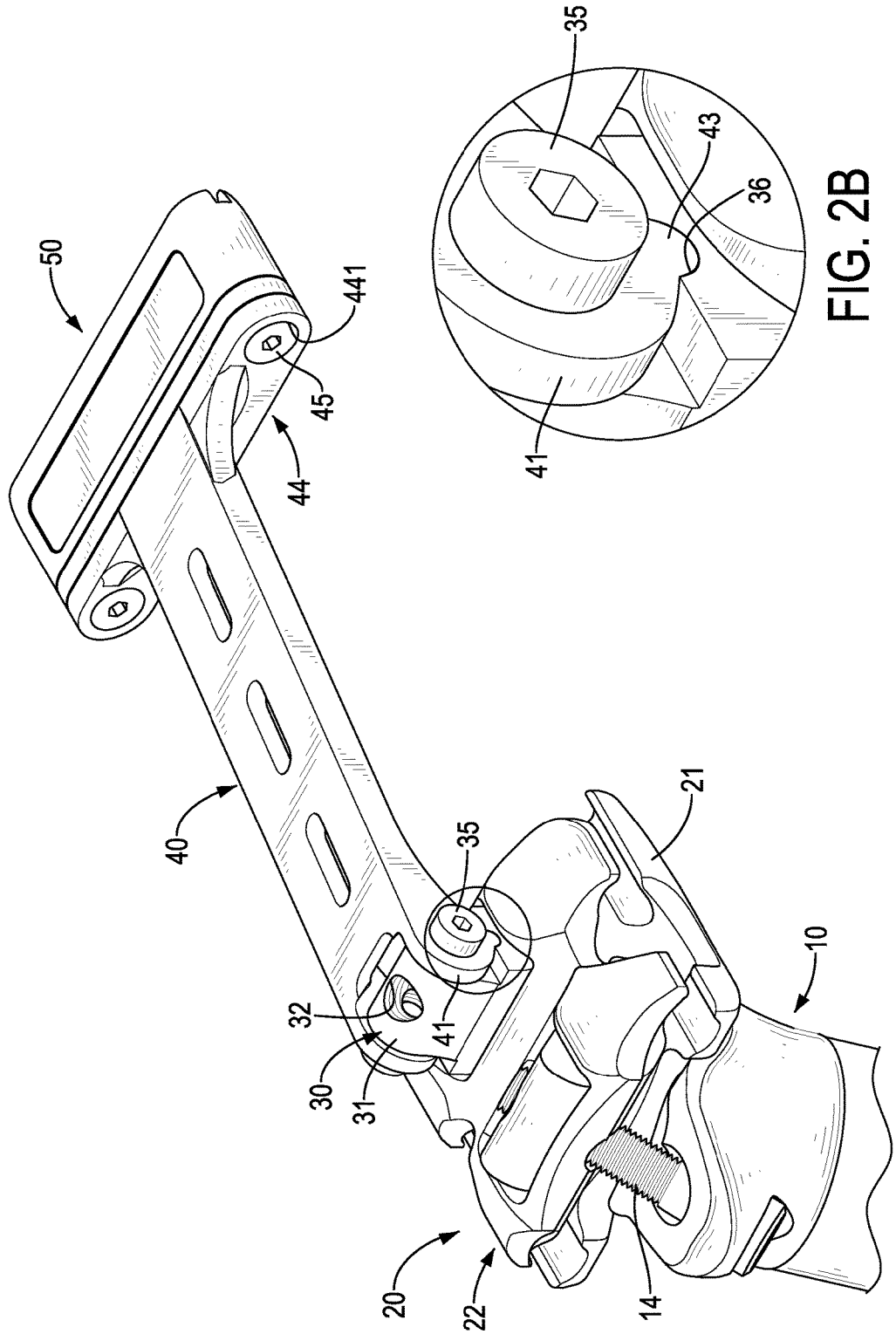
FIG. 2A is a perspective view of the seatpost in FIG. 1, showing the seatpost connected to the taillight.
FIG. 2B is an enlarged perspective view of the seatpost in FIG. 2A.

With reference to FIGS. 1 to 4, the present invention provides a seatpost with a connecting mount, and the seatpost has a post body 10, an adjusting mount 20 connected to the post body 10, and a connecting mount detachably connected to the adjusting mount 20. A saddle 70 is assembled to the seatpost by two saddle rails 71 connected to the adjusting mount 20. The connecting mount has a connecting unit 30 fixed to the adjusting mount 20 and a connecting bracket 40 connected to the connecting unit 30. The connecting bracket 40 is provided for assembling a taillight 50.

With reference to FIGS. 2A, 2B, 3, and 4, the post body 10 has an upper end and a supporting base 11 disposed at the upper end of the post body 10. The supporting base 11 has an upper surface, a front end, a rear end, a concave recess 12, and two bores 13. The front end and the rear end of the supporting base 11 are opposite in a longitudinal direction. The concave recess 12 is formed in the upper surface of the supporting base 11 and extends along a lateral direction that intersects the longitudinal direction. The two bores 13 are respectively formed through the front end and the rear end of the supporting base 11. The two bores 13 are inclined. The two bores 13 extend upwards and towards each other. A first bolt 14 and a second bolt 15 respectively pass through the two bores 13, and are fastened to the adjusting mount 20.

The adjusting mount 20 is connected to a top portion of the supporting base 11 and is unmovable relative to the supporting base 11. The adjusting mount 20 has a lower clamping member 21, an upper clamping member 22, and a barrel nut 23. The lower clamping member 21 has a bottom corresponding in shape to the concave recess 12 of the post body 10. The bottom of the lower clamping member 21 is mounted in the concave recess 12. The upper clamping member 22 has a front end, a rear end, two passing holes 221, and two receiving recesses 222. The front end and the rear end of the upper clamping member 22 are opposite in the longitudinal direction. The two passing holes 221 respectively correspond to the first bolt 14 and the second bolt 15 in position, and are respectively disposed at the front end and the rear end of the upper clamping member 22.

The two receiving recesses 222 respectively correspond to the two passing holes 221 in position. The two receiving recesses 222 respectively communicate with the two passing holes 221. The barrel nut 23 is inserted in one of the two receiving recesses 222 that is disposed at the front end of the upper clamping member 22. The barrel nut 23 is capable of swinging in the receiving recess 222 and has a fixing hole 231. The fixing hole 231 is disposed in a middle portion of the barrel nut 23 and has an inner thread. The first bolt 14 which is disposed at the front end of the upper clamping member 22 is fastened to the fixing hole 231 of the barrel nut 23.

The connecting unit 30 has a bottom, a connecting portion 31, and a threaded hole 32. The bottom of the connecting unit 30 is inserted in one of the two receiving recesses 222 that is disposed at the rear end of the upper clamping member 22. The bottom of the connecting unit 30 is capable of swinging in the receiving recess 222 of the upper clamping member 22. The connecting portion 31 is formed on and protrudes upwards from the bottom of the connecting unit 30. The threaded hole 32 is defined through a middle portion of the connecting unit 30 and has an inner thread. The second bolt 15 which is disposed at the rear end of the upper clamping member 22 is fastened to the threaded hole 32 to fix and position the connecting unit 30. The second bolt 15 mounted in the threaded hole 32 by threading make the connecting unit 30 be unmovable relative to the adjusting mount 20. By tightening the first bolt 14 and the second bolt 15, the two saddle rails 71 of the saddle 70 are clamped by the lower clamping member 21 and the upper clamping member 22 to fix and position the saddle 70.

The connecting portion 31 has two sides, two abutting recesses 33, and two fastening holes 34. The two sides of the connecting portion 31 are opposite in the lateral direction. The two abutting recesses 33 correspond in position and are respectively disposed on the two sides of the connecting portion 31. The two fastening holes 34 correspond in position and are respectively disposed on the two sides of the connecting portion 31. Each one of the two fastening holes 34 has an inner thread. Two fastening units 35 are respectively fastened to the two fastening holes 34. Each one of the two abutting recesses 33 has a lower side and an engaging pit 36 formed in the lower side of the abutting recess 33. The two fastening holes 34 may be coaxially aligned.

The connecting bracket 40 is elongated and has a front end, a rear end, and two connecting plates 41. The front end and the rear end of the connecting bracket 40 are opposite in the longitudinal direction. The two connecting plates 41 are disposed at the front end of the connecting bracket 40, and respectively and correspondingly abut against the two abutting recesses 33. Each one of the two connecting plates 41 has an outer face, a through hole 42 and an engaging protrusion 43. The two outer faces of the two connecting plates 41 respectively face to contrary directions. The two fastening units 35 are respectively mounted through the two through holes 42. The two fastening units 35 are respectively fastened to the two fastening holes 34. The two connecting plates 41 are screwed with the two sides of the connecting portion 31 by the two fastening units 35. The front end of the connecting bracket 40 is connected to the connecting unit 30. In the embodiment of the present invention, the two fastening holes 34 are arranged coaxially. The two fastening holes 34 may not be coaxial as well for preventing the connecting bracket 40 from rotating relative to the connecting unit 30. The two fastening holes 34 may also be inclined downward and at a small angle with the lateral direction.

Each one of the two engaging protrusions 43 corresponds in shape to the engaging pit 36 of a respective one of the two abutting recesses 33. The two engaging protrusions 43 respectively engage with two engaging pits 36 for keeping a settling angle of the connecting bracket 40 constant. The connecting bracket 40 further has an assembling board 44 with a width W1. The width W1 of the assembling board 44 is wider than a width W2 defined between the two outer faces of the two connecting plates 41. The assembling board 44 has two assembling holes 441 respectively and symmetrically disposed in the lateral direction. The taillight 50 has a front end and two threaded holes 51. The two threaded holes 51 are disposed at the front end of the taillight 50 and respectively correspond to the two assembling holes 441 in position.

Two threading bolts 45 respectively pass through the two assembling holes 441 and are respectively fastened to the two threaded holes 51 to securely assemble the taillight 50 to the connecting bracket 40. The taillight 50 is arranged behind the saddle 70 and is at an optimum height for viewing. Connecting manners between the connecting bracket 40 and the connecting unit 30 are not restricted by the embodiment of the present invention. For example, the front end of the connecting bracket 40 may be integrally formed on the connecting unit 30 as well.

Figure 3:
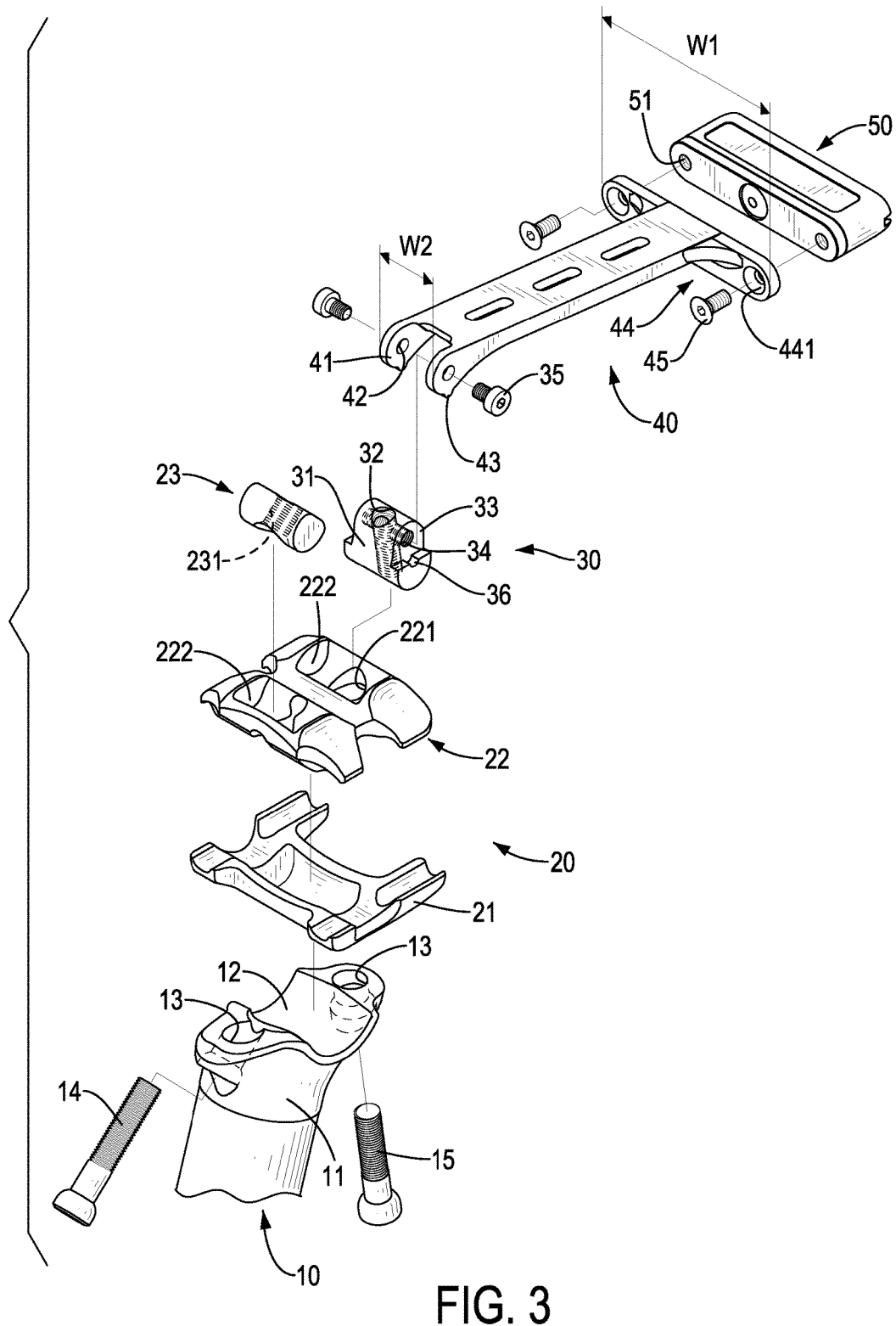
FIG. 3 is a partially exploded perspective view of the seatpost in FIG. 2A.
Figure 4:
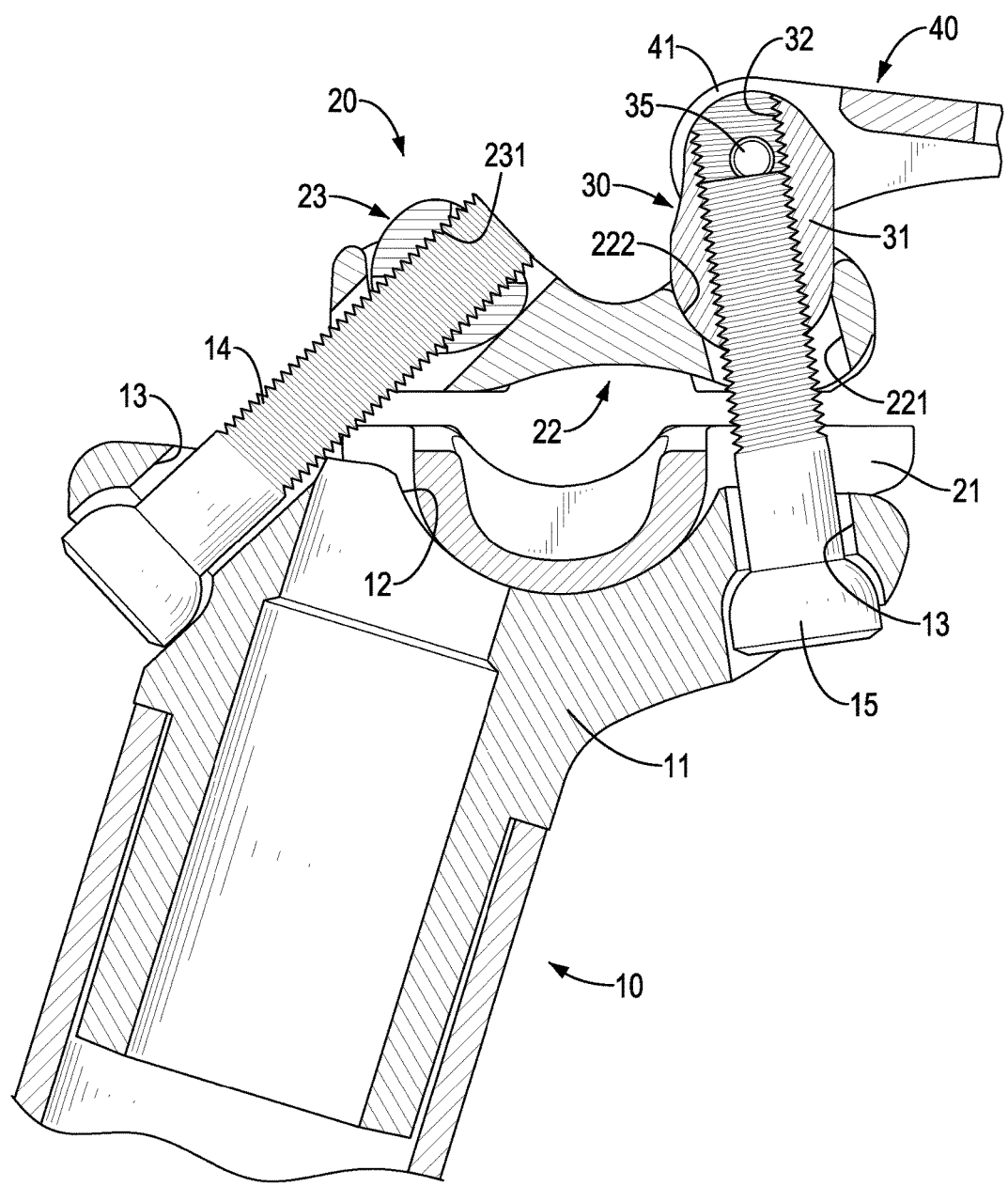
FIG. 4 is a side view in partial section of the seatpost in FIG. 2A.

With reference to FIGS. 1, 3, and 4, compared to the prior art with two barrel nuts respectively inserted in two receiving recesses of an upper clamping member, the present invention replaces one of the two barrel nuts respectively disposed at a front end and a rear end of the upper clamping member. The first bolt 14 and the second bolt 15 respectively pass through the two bores 13 disposed at the front end and the rear end of the supporting base 11, through the two passing holes 221 disposed at the front end and the rear end of the upper clamping member 22 of the adjusting mount 20, and are respectively fastened to the fixing hole 231 of the barrel nut 23 and the fastening hole 32 of the connecting unit 31 by threads. The two saddle rails 71 are securely clamped by the lower clamping member 21 and the upper clamping member 22 of the adjusting mount 20. And the connecting unit 30, the connecting bracket 40, and the taillight 50 are securely connected to the post body 10 at the same time.

Structure of the present invention is simple and is capable of being applied to the conventional seatpost with two barrel nuts. The connecting bracket 40 extends from a connecting position of the connecting bracket 40 and the saddle 70 towards a direction that the rear end of the upper clamping member 22 faces to. The seatpost in accordance with the present invention offers an optimum assembling height for the taillight 50 and promotes both visibility and light warning effect of the taillight 50.

Figure 5:
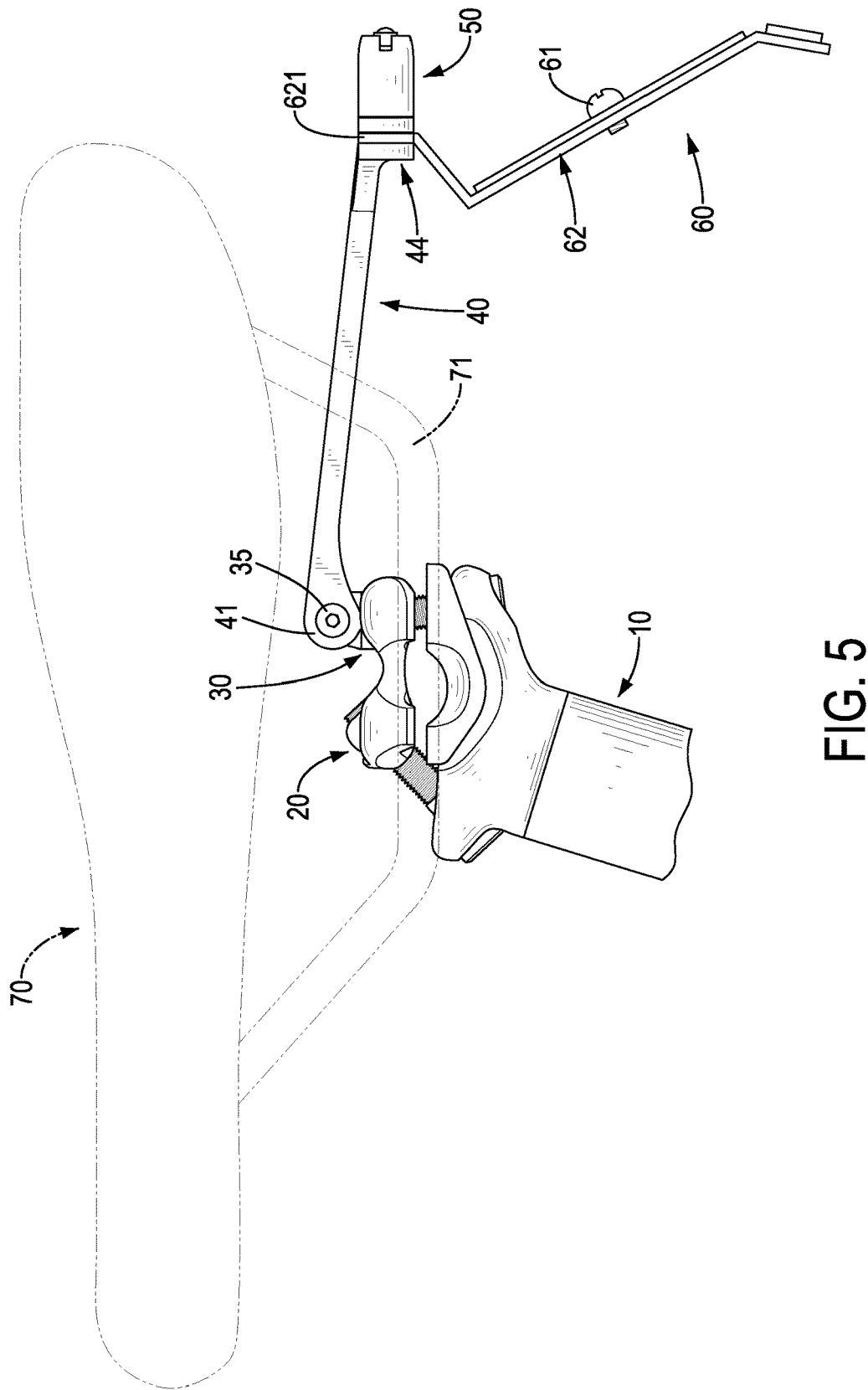
FIG. 5 is a side view of the seatpost in accordance with the present invention, connected to the taillight and a bicycle license plate.
Figure 6:
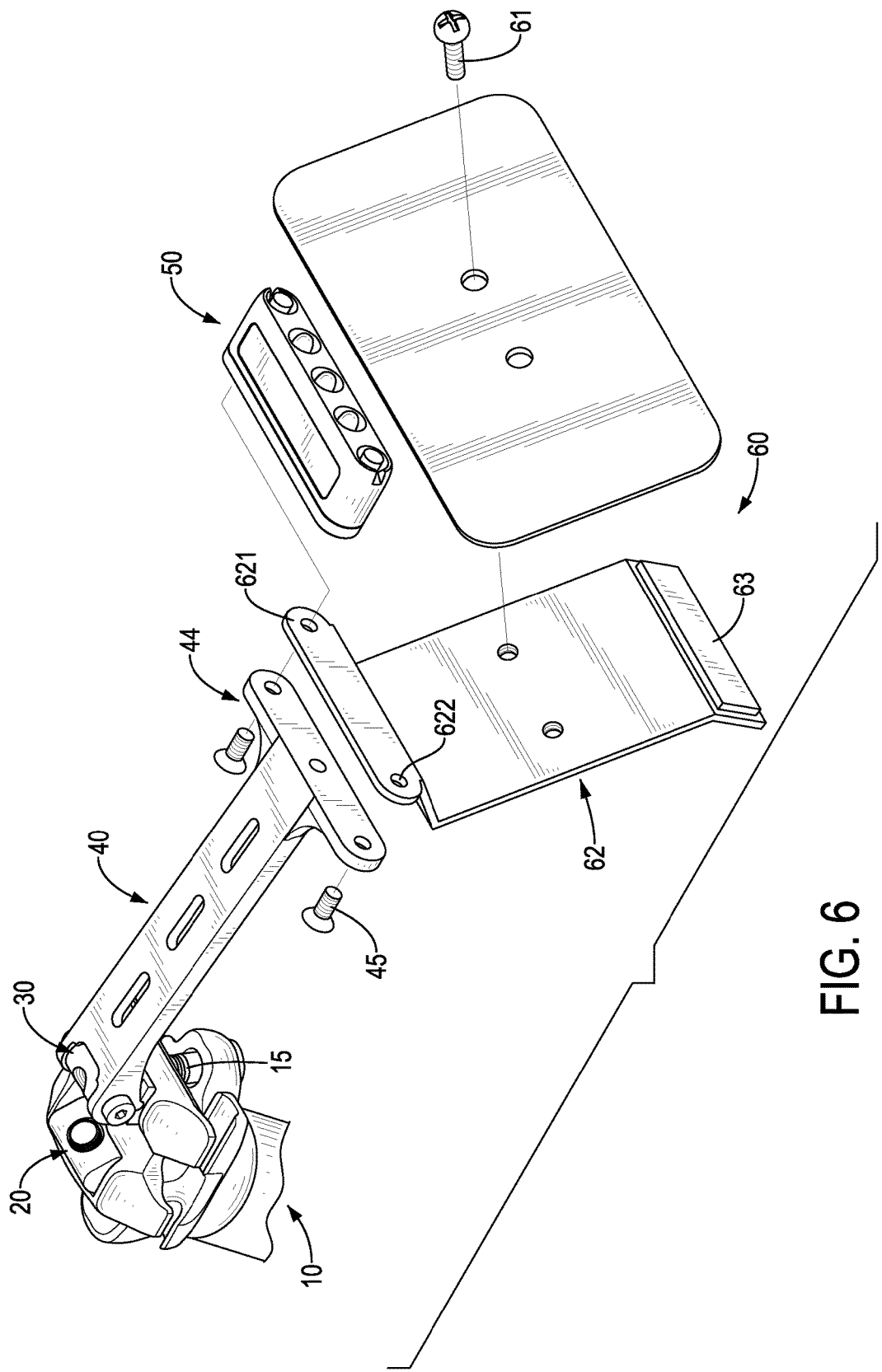
FIG. 6 is a partially exploded perspective view of the seatpost in FIG. 5.

The assembling board 44 of the connecting bracket 40 is applicable for assembly of accessories such as taillights, warning lights, bicycle license plates, license plate frames, and decorations, etc. With reference to FIGS. 5 and 6, a license plate frame 62 and the taillight 50 are assembled on the assembling board 44 of the connecting bracket 40 at the same time. A bicycle license plate 60 is screwed with the license plate frame 62 by two bolts 61 to achieve purpose of simultaneously assembling the taillight 50 and the bicycle license plate 60. The license plate frame 62 has an upper end, a lower end, and a combining plate 621 disposed at the upper end of the license plate frame 62.

The combining plate 621 corresponds to the assembling board 44 in shape and has two communicating holes 622. The combining plate 621 of the license plate frame 62 is clamped by the assembling board 44 and the taillight 50, and is connected to the assembling board 44 and the taillight 50. A reflective marking plate 63 is further adhered to the lower end of the license plate frame 62. In the embodiment of the present invention, the bicycle license plate 60 may be directly screwed with the assembling board 44 by the two bolts 61 as well.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A seatpost comprising:
   a post body having
      an upper end;
      a supporting base disposed at the upper end of the post body and having
         a rear end; and
         a bore formed through the rear end of the supporting base; and
      a bolt disposed through the bore;
   an adjusting mount connected to the supporting base, being unmovable relative to the supporting base, and having
      a rear end; and
      a passing hole disposed at the rear end of the adjusting mount, and the bolt mounted through the passing hole;
   a connecting unit connected to the adjusting mount, being unmovable relative to the adjusting mount, and having
      a connecting portion having a threaded hole, and the bolt mounted in the threaded hole by threading; and
   a connecting bracket having
      a front end connected to the connecting portion;
      a rear end opposite the front end of the connecting bracket; and
      an assembling board disposed at the rear end of the connecting bracket.

2. The seatpost as claimed in claim 1, wherein
   the connecting portion has
      two sides;
      two abutting recesses respectively disposed on the two sides of the connecting portion;
      two fastening holes respectively disposed on the two sides of the connecting portion;
   the connecting bracket has
      two connecting plates disposed at the front end of the connecting bracket, respectively and correspondingly abutting against the two abutting recesses, and having
         two through holes respectively disposed on the two connecting plates; and
   two fastening units respectively pass through the two through holes, and are respectively inserted into and fastened to the two fastening holes.

3. The seatpost as claimed in claim 2, wherein
   each one of the two abutting recesses has an engaging pit; and
   each one of the two connecting plates has an engaging protrusion corresponding in shape to the engaging pit of a respective one of the two abutting recesses.

4. The seatpost as claimed in claim 3, wherein
   the adjusting mount has
      a lower clamping member; and
      an upper clamping member having
         a rear end; and
         a receiving recess disposed at the rear end of the upper clamping member;
   the bore is defined through the rear end of the upper clamping member and communicating with the receiving recess; and
   the connecting unit has a bottom portion inserted in the receiving recess.

5. The seatpost as claimed in claim 4, wherein a taillight is connected to the assembling board of the connecting bracket.

6. The seatpost as claimed in claim 4, wherein a taillight and a license plate bracket are connected to the assembling board of the connecting bracket.

7. The seatpost as claimed in claim 2, wherein
   the adjusting mount has
      a lower clamping member; and
      an upper clamping member having
         a rear end; and
         a receiving recess disposed at the rear end of the upper clamping member;
   the bore is defined through the rear end of the upper clamping member and communicating with the receiving recess; and
   the connecting unit has a bottom portion inserted in the receiving recess.

8. The seatpost as claimed in claim 7, wherein a taillight is connected to the assembling board of the connecting bracket.

9. The seatpost as claimed in claim 7, wherein a taillight and a license plate bracket are connected to the assembling board of the connecting bracket.

10. The seatpost as claimed in claim 1, wherein
    the adjusting mount has
       a lower clamping member; and
       an upper clamping member having
          a rear end; and
          a receiving recess disposed at the rear end of the upper clamping member;
    the bore is defined through the rear end of the upper clamping member and communicating with the receiving recess; and
    the connecting unit has a bottom portion inserted in the receiving recess.

11. The seatpost as claimed in claim 10, wherein a taillight is connected to the assembling board of the connecting bracket.

12. The seatpost as claimed in claim 10, wherein a taillight and a license plate bracket are connected to the assembling board of the connecting bracket.

13. A connecting mount comprising:
- a connecting unit having
  - a connecting portion having
    - a threaded hole;
    - two sides;
    - two abutting recesses respectively disposed on the two sides of the connecting portion; and
    - each one of the two abutting recesses having an engaging pit; and
    - two fastening holes respectively disposed on the two sides of the connecting portion; and
- a bolt passing through a post body and connected to the threaded hole; and
- a connecting bracket having
  - a front end connected to the connecting portion;
  - a rear end opposite the front end of the connecting bracket;
  - an assembling board disposed at the rear end of the connecting bracket; and
  - two connecting plates disposed at the front end of the connecting bracket, respectively and correspondingly abutting against the two abutting recesses, and having
    - two through holes respectively disposed on the two connecting plates;
  - each one of the two connecting plates having an engaging protrusion corresponding in shape to the engaging pit of a respective one of the two abutting recesses; and
  - two fastening units respectively passing through the two through holes, and respectively inserted into and fastened to the two fastening holes.

14. The connecting mount as claimed in claim 13, wherein a taillight is connected to the assembling board of the connecting bracket.

* * * * *